United States Patent Office 2,829,043
Patented Apr. 1, 1958

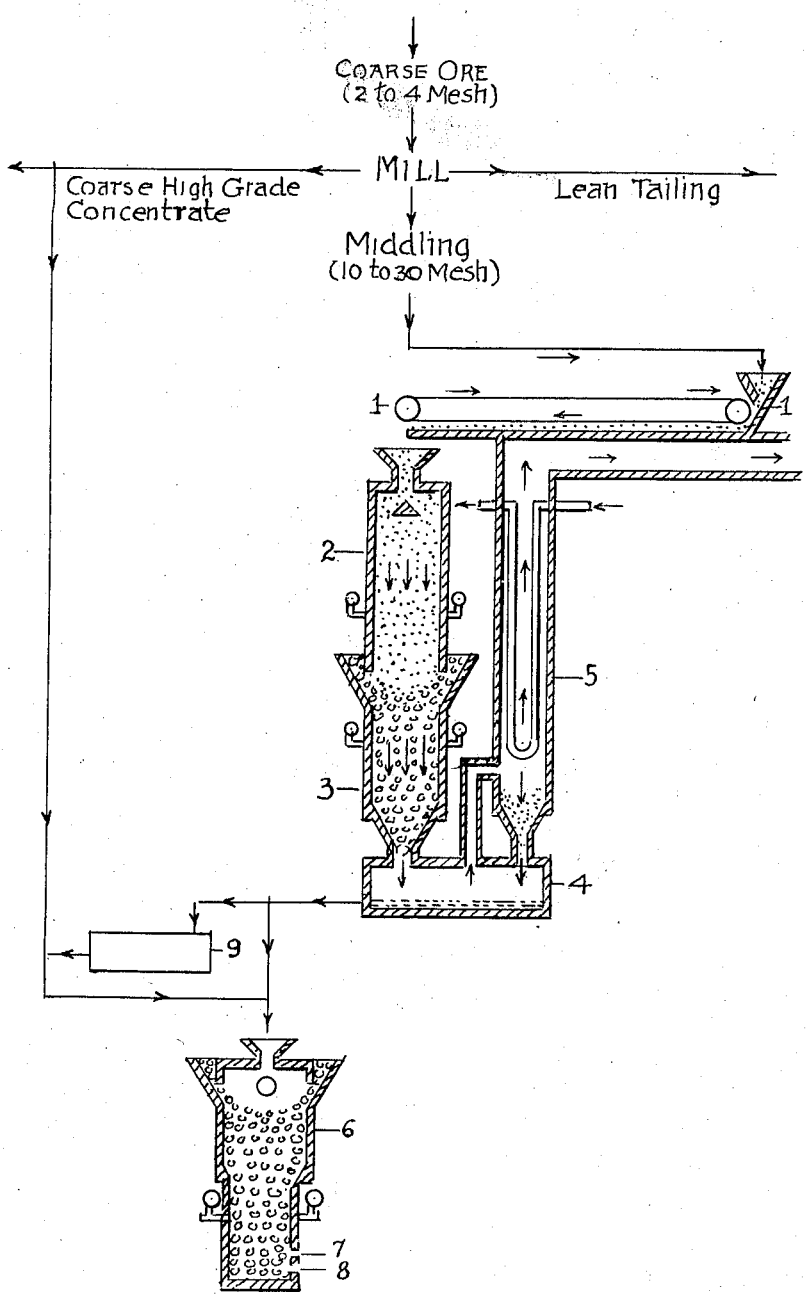

2,829,043
PROCESS OF TREATING LOW GRADE IRON ORES

William E. Greenawalt, Denver, Colo.

Application August 13, 1956, Serial No. 603,730

3 Claims. (Cl. 75—40)

My invention relates to processes of treating low grade iron ore. The usual method of treating such ores is to concentrate the crude mine ore to produce a high grade concentrate and a lean tailing by various milling methods, such as gravity, flotation, or magnetic separation. This involves expensive repeated fine grinding and concentration until a satisfactory separation is made. This is difficult and frequently ineffective when the iron is intimately associated with the gangue or silica. The end products of such a procedure are usually a finely ground and fairly high grade concentrate and a fairly lean tailing. The concentrate is pelletized, and sintered at the fusion temperature of about 2300 deg. F., and charged into a blast furnace to convert the iron oxide of the concentrate into pig iron and to slag impurities.

The object of my invention is to eliminate progressive fine grinding, pelletizing, and sintering, and recover the metallic iron by the more direct way of smelting.

Almost all low grade ores are capable of producing a high grade concentrate and a lean tailing with the production of a large middling; but the middling, whether embodied in the ore mass or as a separate factor, is the crux of the solution of the ore treatment problem as a whole.

My process will now be described by referring to the accompanying drawing, which represents a flow diagram of it. The mine ore is coarsely ground to the desired size, usually between 1, 2, and 4 mesh, and subjected to any of the usual methods of mill concentration to produce a high grade coarse concentrate, a lean tailing, and a medium grade middling. The coarse ore concentrate may be smelted direct in a blast furnace in the usual way, without sintering or further treatment of any kind. The tailing is wasted. The middling, which will vary in amount and quality according to the ore, is ground fine enough to be melted in its descent through a shower shaft melting furnace, usually between 10 and 30 mesh. The finely ground middling, usually wet, is dried in the drier 1 and showered through the highly heated atmosphere of a melting furnace 2 in the upper part of a vertical shaft, and flows through a coalescing chamber 3 in the lower part of the vertical shaft, filled with coarse solid material, to coalesce the molten dust of the middling into liquid form. The mixture of molten middling and melting furnace gas, freed or partly freed from dust flows into the gas separating chamber 4, where the melting furnace gas is separated from the unreduced middling, and where a small amount of dust, if any, is settled out and separated from the melting furnace gas. The melting furnace gas then flows through the heat exchanger 5 where fresh air is heated to be used anywhere in the process. The dust, if any, which settles out in the heat exchanger is returned to the gas separating chamber, where it is fused and mixed with the molten middling. The hot waste gas issuing from the heat exchanger is delivered to the drier 1, to dry fresh middling.

The unreduced molten middling, freed from dust and separated from the melting furnace gas, then, preferably, flows through a highly heated column of carbon in the smelting furnace 6 where the iron in the unreduced middling is converted into pig iron and the impurities are slagged. The slag flows out through the slag hole 7, and the pig iron through the tap hole 8.

If, for any reason it is found inconvenient to smelt the molten middling direct, it may be granulated by chilling or quenching in the granulator 9, which may be any means of chilling and converting the molten middling into solid granules or lumps for regular blast furnace smelting, in which case it would be mixed with the coarse concentrate obtained from the mine ore, and smelted as a mixture, much the same as sinter or nodules are smelted in ordinary blast furnace practice.

Some low grade ores, such as non-magnetic taconite, are usually roasted as a whole to convert the iron into magnetic form. That requires a temperature of about 1800 deg. F. The roasted ore is then subjected to magnetic separation. In my process only the middling, which may represent twenty to fifty percent of the original ore, is raised about 500 degrees higher, to about 2200–2300 deg. F., to melt it; but the amount so melted is only from twenty to fifty percent of the original ore, and the middling, once melted, can be smelted direct into pig iron and slag, without repeated regrinding and mill concentration followed by pelletizing, and sintering at about 2300 deg. F., and again raising the temperature of the cold sinter to the melting temperature in the smelting furnace; and the recovery of iron by smelting is greater than is possible by any milling methods. My process is not limited to any particular method of separating the molten dust from the melting furnace gas, or of separating the melting furnace gas from the molten ore.

I claim:

1. A process of treating low grade iron ore comprising, milling the coarsely ground ore to produce a coarse high grade iron ore concentrate, a lean tailing, and a medium grade middling, finely grinding the middling, showering the finely ground middling through the highly heated atmosphere of a melting furnace to melt it, separating the molten dust from the melting furnace gas, separating the melting furnace gas from the unreduced molten middling, passing the unreduced molten middling through a highly heated column of carbon in a smelting furnace to reduce the iron of the middling and slag impurities, and separating the molten iron from the molten slag.

2. A process of treating low grade iron ore comprising, milling the coarsely ground ore to produce a coarse high grade iron ore concentrate, a lean tailing, and a medium grade middling, finely grinding the middling, showering the finely ground middling through the highly heated atmosphere of a melting furnace to melt it, separating the molten dust from the melting furnace gas, separating the melting furnace gas from the unreduced molten middling, converting the unreduced molten middling into solid granules, and smelting the unreduced granules into pig iron and slag.

3. A process of treating low grade iron ore comprising, milling the coarsely ground ore to produce a high grade iron or concentrate, a lean tailing, and a medium grade middling, finely grinding the middling, showering the finely ground middling through the highly heated atmosphere of a melting furnace to melt it, separating the molten dust from the melting furnace gas, separating the melting furnace gas from the unreduced molten middling, converting the unreduced molten middling into solid form, and smelting the mixture of unreduced solid middling and the high grade mill coarse concentrate to convert both into pig iron and slag.

(References on following page)

References Cited in the file of this patent

UNITED STATES PATENTS

| | | |
|---|---|---|
| 57,969 | Reese | Sept. 11, 1866 |
| 859,572 | McDonald | July 9, 1907 |
| 2,307,459 | Greenawalt | Jan. 5, 1943 |
| 2,321,310 | Moore | June 8, 1943 |

FOREIGN PATENTS

| | | |
|---|---|---|
| 157,295 | Great Britain | Apr. 10, 1922 |
| 657,725 | Germany | Feb. 24, 1938 |
| 900,382 | France | June 27, 1945 |